United States Patent
Mahlo et al.

(10) Patent No.: US 7,072,755 B2
(45) Date of Patent: Jul. 4, 2006

(54) ELECTRONICALLY PROGRAMMABLE METHOD FOR IMPROVING THE CONTROL BEHAVIOR OF AN ANTI-LOCK BRAKING CONTROL SYSTEM

(75) Inventors: Rüdiger Mahlo, Königstein (DE); Dieter Burkhard, Bingen-Büdelheim (DE)

(73) Assignee: Continental AG & Co., oHG, Frankfort (DE)

( * ) Notice: Subject to any disclaimer, the term of this patent is extended or adjusted under 35 U.S.C. 154(b) by 183 days.

(21) Appl. No.: 10/474,547

(22) PCT Filed: Apr. 2, 2002

(86) PCT No.: PCT/EP02/03602

§ 371 (c)(1), (2), (4) Date: Mar. 3, 2004

(87) PCT Pub. No.: WO02/083471

PCT Pub. Date: Oct. 24, 2002

(65) Prior Publication Data

US 2004/0138803 A1    Jul. 15, 2004

(30) Foreign Application Priority Data

Apr. 10, 2001  (DE)  .................. 101 17 997
Feb. 26, 2002  (DE)  .................. 102 08 125

(51) Int. Cl.
 *B60T 7/12* (2006.01)
 *B60T 8/32* (2006.01)

(52) U.S. Cl. .................. 701/71; 701/69; 701/78; 701/83; 303/138

(58) Field of Classification Search ............ 701/69–74, 701/78, 82, 83; 180/197; 303/122.02, 138
See application file for complete search history.

(56) References Cited

U.S. PATENT DOCUMENTS

| | | | |
|---|---|---|---|
| 5,341,297 A | | 8/1994 | Zomotor et al. |
| 6,012,010 A | * | 1/2000 | Batistic et al. ............... 701/72 |
| 6,223,115 B1 | * | 4/2001 | Batistic ........................ 701/72 |
| 6,289,272 B1 | * | 9/2001 | Batistic et al. ............... 701/72 |

FOREIGN PATENT DOCUMENTS

| | | |
|---|---|---|
| DE | 4441624 | 5/1996 |
| DE | 4446582 | 6/1996 |
| DE | 19622838 | 12/1996 |
| DE | 19707106 | 10/1997 |
| DE | 19719466 | 12/1997 |
| DE | 19732998 | 2/1999 |

* cited by examiner

*Primary Examiner*—Yonel Beaulieu

(57) ABSTRACT

The present invention relates to a method for improving an anti-lock control system, in particular for improving driving stability during braking on laterally different coefficients of friction. According to the method, a desired yaw rate is determined using at least one steering angle signal of a steering angle sensor and an actual yaw rate is determined using at least one yaw rate sensor, and the instability is evaluated using a parameter that serves for a qualitative and quantitative judgment of a deviation between the actual yaw rate and the desired yaw rate. Both yaw rate deviation and the time derivative of the yaw rate deviation are used to determine the parameter.

11 Claims, 4 Drawing Sheets

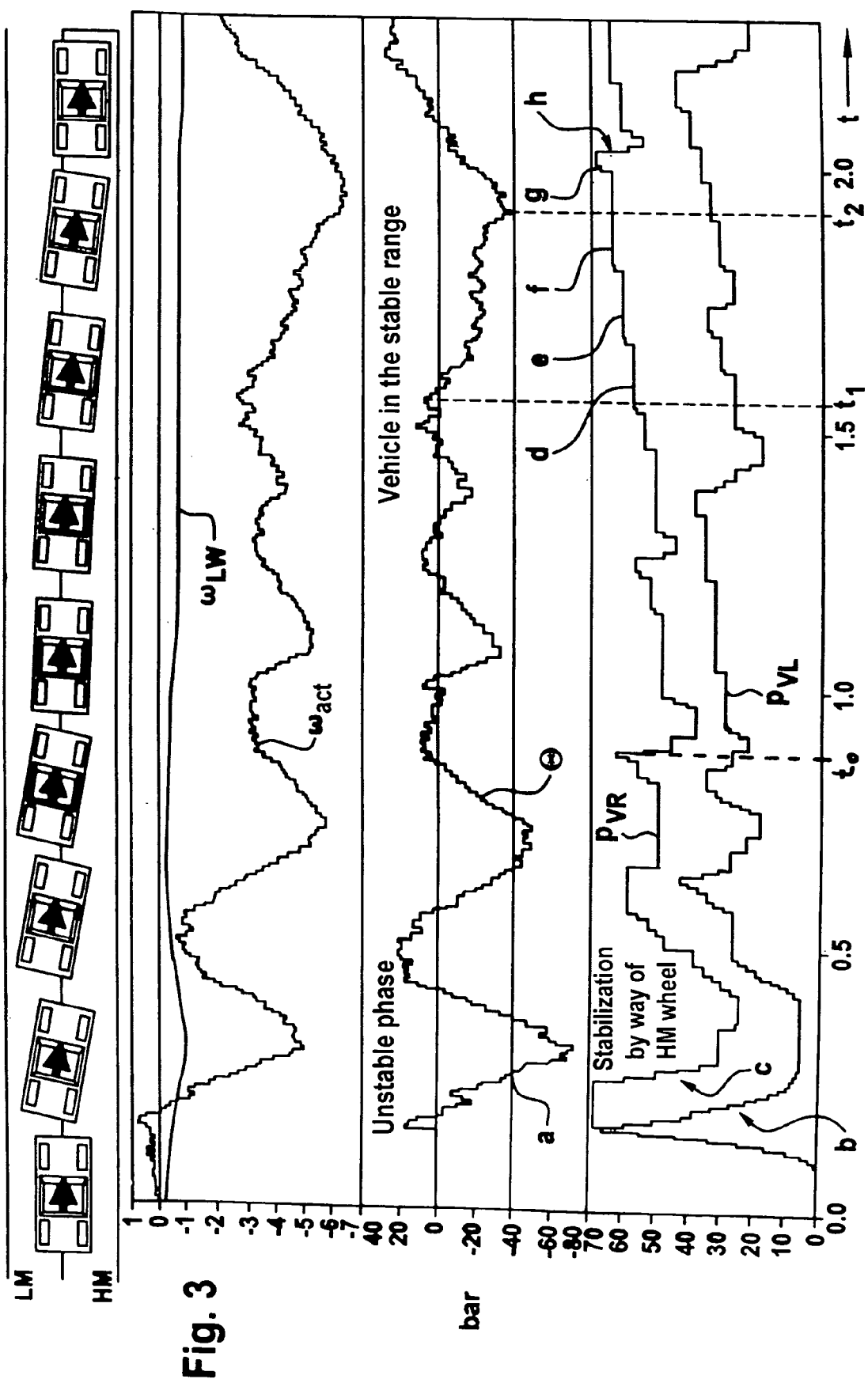

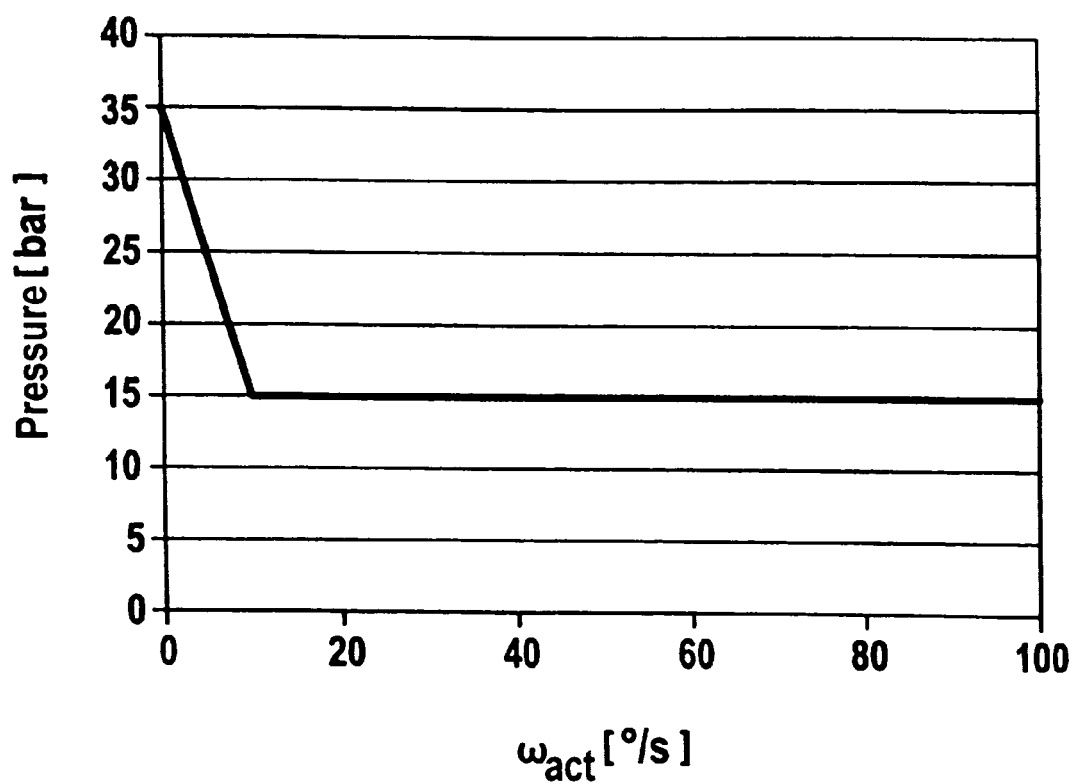

ELECTRONICALLY PROGRAMMABLE METHOD FOR IMPROVING THE CONTROL BEHAVIOR OF AN ANTI-LOCK BRAKING CONTROL SYSTEM

PRIOR ART

The present invention relates to a method for improving an anti-lock control system, in particular for improving driving stability during braking on laterally different coefficients of friction.

The wheel rotational behavior is measured and taken into account for determining the wheel slip and for brake pressure modulation in principally known control methods. In the wheel-individual control (individual control, single wheel control) of vehicle wheels, the brake pressure of each wheel is controlled irrespective of the rotational behavior of the other wheels. Admittedly, short braking distances can be achieved with this procedure. E.g. on roadways with a laterally divided friction situation (μ-split), however, a yaw torque about a vertical vehicle axis may develop, necessitating active countersteering by the vehicle operator for compensation in order to prevent undesirable change in the driving direction. Not all vehicle operators consider themselves capable of keeping an unexpectedly yawing vehicle to the track.

To reduce yaw torque caused by braking on laterally different coefficients of friction, a so-called yaw torque build-up retardation (GMA) has become known, which effects a retarded pressure build-up in the wheel brake of a front wheel running on the road side with higher coefficient of friction (high-wheel) (Fahrsicherheitssysteme [vehicle safety systems], 2nd edition 1998, Vieweg, page 53 et sqq.).

In vehicles with a less critical driving behavior the brake pressure at the high-wheel is built up in steps as soon as the low-wheel due to a locking tendency undergoes a first pressure reduction. When the brake pressure of the high-wheel reaches its locking level, it is no longer influenced by the signals of the low-wheel but controlled individually. Only then will the possible brake force be utilized at this wheel.

In vehicles with a particularly critical driving behavior (short wheel base, low moment of inertia, low rear-axle tire contact area), pressure build-up at the high-wheel will also follow pressure reduction and subsequent pressure build-up on the low-wheel, with the pressure build-up pause times being by a defined factor longer than with the low-wheel.

The prior art yaw torque build-up retardation (GMA) requires a sophisticated adaptation to the vehicle concerned in order to reach a compromise between steering behavior and stopping distance. Said GMA system suffers from the shortcoming that the brake potential is not fully utilized, because the high-wheel is generally underbraked to a great degree.

DE 42 08 141 C2 discloses an anti-lock control system for automotive vehicles processing signals from a yaw sensor system. Said known ABS system detects the yaw acceleration of the vehicle and adapts the slip ratio between left and right wheels so that the yaw acceleration is reduced. Said system requires improvement because not all the driving situations are considered.

It is an object of the invention to overcome the shortcomings of the state of the art. Another objective is to better utilize the brake potential of the vehicle wheels, especially the high-wheel.

According to the invention, this object is achieved by the features of patent claim 1. The wheel rotational behavior is measured and used to determine the wheel slip and for brake pressure modulation. In this arrangement, driving stability is determined by using at least one steering angle sensor for measuring a steering request and by using at least one yaw rate sensor for measuring the vehicle yaw behavior, and is evaluated by way of a parameter Θ that is determined for qualitatively and quantitatively judging a deviation between actual yaw rate $\omega_{act}$ and desired yaw rate $\omega_{LW}$ by employing the measured actual yaw rate $\omega_{act}$, by employing a measured desired yaw rate $\omega_{LW}$, and by employing the time derivative of the difference between actual yaw rate $\omega_{act}$ and desired yaw rate $\omega_{LW}$.

ADVANTAGES OF THE INVENTION

With a view to influencing yaw torque, pressure modulation is executed especially during ABS control intervention in dependence on a parameter Θ characterizing driving stability according to the invention. It is possible to consider said parameter in the partial braking range—outside of ABS control cycles.

The invention permits an adaptive design of the anti-lock pressure modulation with influencing yaw torque in response to the degree of instability. The coefficient of friction available is better utilized because pressure build-up times generally increased by a defined coefficient are not envisaged on the high-wheel after pressure reduction. With short stopping distances, yaw torque is effectively influenced.

Further details of the invention can be seen in the subclaims in connection with the description and the accompanying drawings. In the drawings, FIG. 1 is a flow chart of an embodiment of the invention.

FIG. 3 shows signal variations $\omega_{act}$, $\omega_{LW}$, Δω, Δω̇, parameter Θ as well as pressure variations $p_{VL}$, $p_{VR}$ respectively as a function of time t.

FIG. 4 shows a maximum allowable pressure difference on wheel brakes of the front axle in dependence on a yaw rate $\omega_{act}$.

DESCRIPTION OF AN EMBODIMENT

Figure 1:
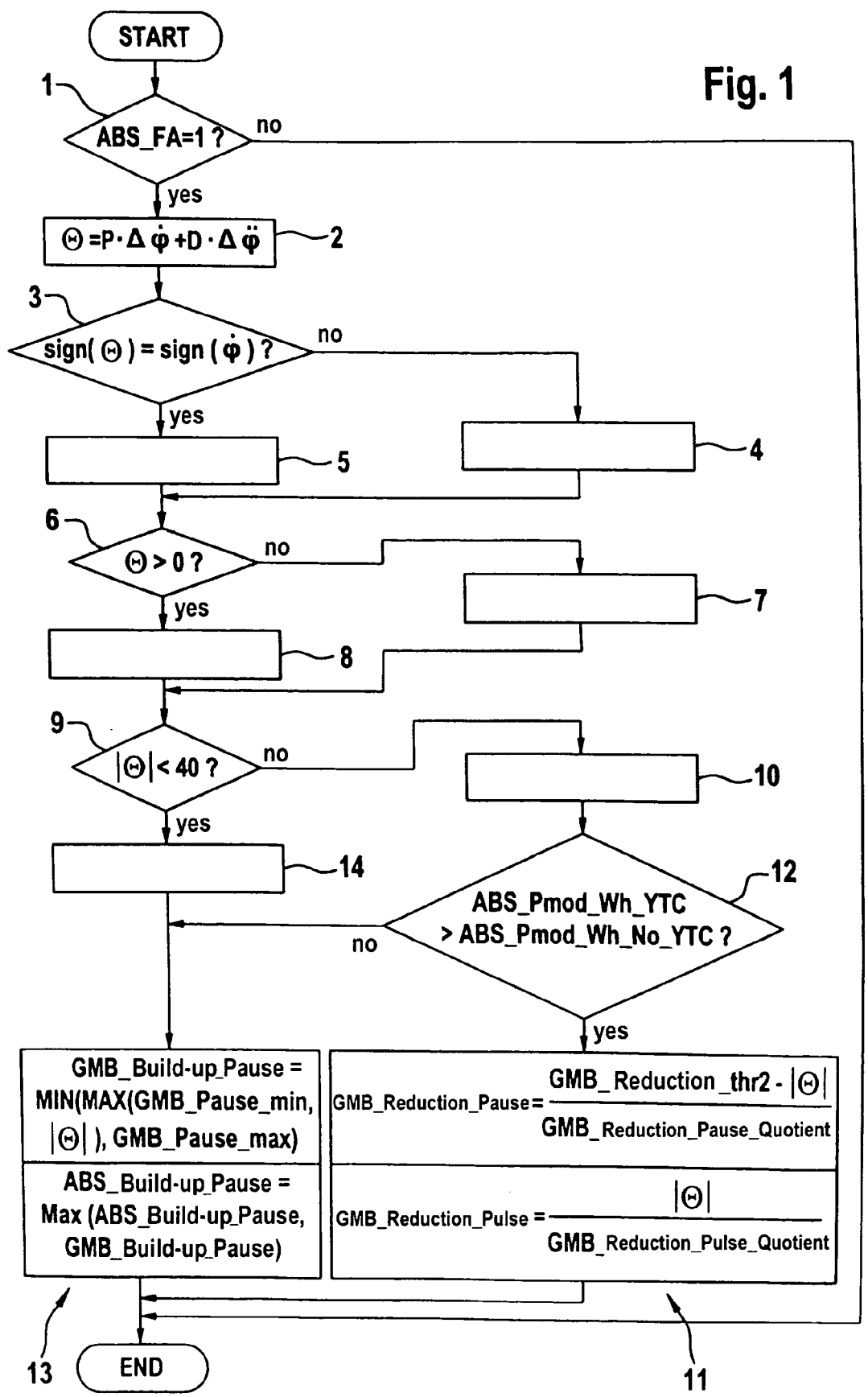

The method run will be explained schematically in the following by way of a flow chart according to FIG. 1. The operation starts when according to a criterion ($ABS_{13}$ FA=1) mentioned at 1 an ABS control intervention is active on at least one wheel of the vehicle front axle. When this does not apply, the procedure is discontinued. The parameter Θ—hereinbelow referred to as stability index—is produced according to 2. Included in parameter Θ are both the yaw rate deviation Δω and the acceleration deviation Δω̇ (time derivative of the yaw rate deviation). A comparison 3 of the signs of parameter Θ and yaw rate deviation Δω permits recognizing whether there is an understeering tendency (4) when the signs are different (which the driver is still able to master, as the case may be), which can be counteracted by pressure build-up modification 13, or whether there is a critical oversteering tendency 5 of the vehicle when the signals are the same, which requires a pressure reduction modification 11.

In a following step 6 (FIG. 1), the wheel of the front axle is determined by way of parameter Θ (stability index) at which yaw torque is influenced. For Θ<0 intervention is effected at the right front wheel 7, while for Θ>0 intervention at the left front wheel 8 is initiated. At reference numeral 9, the amount of the parameter Θ is taken into account as a threshold in order to characterize the stability of the current driving condition. According to the present embodiment, an unstable driving condition 10 prevails for parameters Θ>40, requiring pressure reduction modifications 11 at the identified high coefficient-of-friction front wheel. The vehicle (i.e. |Θ|>Ysens_pdec_thr1=40) cannot be stabilized by pressure build-up modification for Θ>40. A stabilizing pressure reduction modification 11 is performed at a front wheel in this phase.

When the vehicle is unstable, the duration of a pressure reduction pulse (GMB_reduction pulse or PDEC_PULSE) and the duration of a pressure reduction pause (GMB_reduction pause or PDEC_PAUSE) between neighboring pressure reduction pulses is calculated as follows:

$$\text{PDEC\_PULSE} = \frac{|\Theta|}{\text{Ysens\_pdec\_pulse\_quotient}(8)}$$

$$\text{PDEC\_PAUSE} = \frac{\text{Ysens\_pdec\_thr2} - |\Theta|}{\text{Ysens\_pdec\_pause\_quotient}(8)}$$

In the above equations the parameter Θ is variable, while the other quantities are fixed. Introducing the determined duration into the control speeds up the pressure reduction at the high coefficient-of-friction wheel and thereby reduces undesirable yaw tendencies. A GMB reduction pause (Min (GMB_reduction pause)) lasts at least five loops long. This minimum reduction time is necessary in order to obtain the reaction of the vehicle to the given pulse. When the vehicle has returned to the stable range, pressure build-up modification 13 may be performed in order to improve brake performance.

For plausibility reasons, a pressure reduction modification is only performed when the result of a comparison 12 is that the wheel brake pressure at the vehicle wheel intended for yaw torque influencing, which pressure is determined from wheel-individual slip values on the basis of a pressure model, is higher than the wheel brake pressure (model pressure) determined on the opposite vehicle wheel. When this plausibility condition is not satisfied, switch-over to a pressure build-up modification 13 is made which is generally provided when vehicle 14 is stable. Within the pressure build-up modification 13, a build-up pause (ABS_build-up pause) is determined on the basis of the pressure model in consideration of the wheel slip condition, and a build-up pause (GMB_build-up pause) is determined on the basis of yaw torque influencing in consideration of the parameter Θ, both determinations being made irrespective of each other. The determined pause times are compared, and the longer pause time is input into the control. The input minimum build-up pause (GMB_build-up pause_min) principally amounts to about 2–3 loops, that means, between approximately 14–30 ms depending on the internal clock time. A minimum pause of 7 loops is adjusted only at the commencement of the control with high yaw rates (>10°/s). The purpose of this special minimum pause is to ensure higher stability in curves from the very beginning. The algorithm ends after having established the necessary pressure modification, and, if necessary, a new calculation loop will start.

Figure 2:
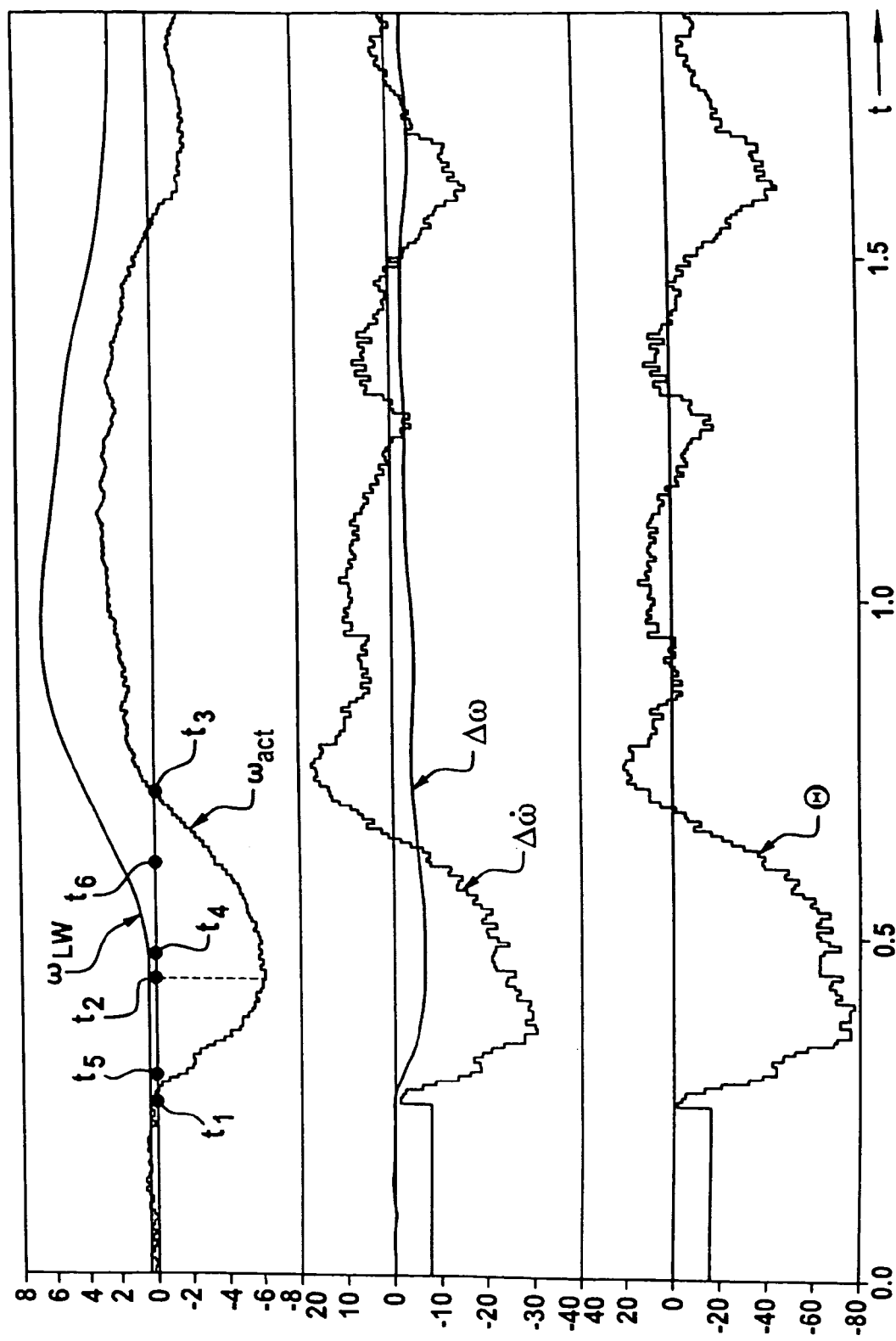
FIG. 2 shows signal variations $\omega_{act}$, $\omega_{LW}$, Δω, Δω̇, and parameter Θ as a function of time t.

FIG. 2 illustrates by way of signal variations vehicle instability caused by a braking operation. In the top part a desired yaw rate $\omega_{LW}$ measured at the steering wheel is depicted in relation to the measured actual yaw rate $\omega_{act}$. At time $t_1$ the vehicle becomes unstable and displays a yawing tendency (starts skidding). As can be seen, this happens independently of the driver's wish ($\omega_{LW}$) because no steering angle variation is introduced. The yaw rate $\omega_{act}$ rises until time $t_2$ and will decline until $t_3$ caused by a countersteering maneuver initiated at time $t_4$. The vehicle changes the yaw direction starting with $t_4$. The middle part of FIG. 2 illustrates the deviation between actual yaw rate $\omega_{act}$ and desired yaw rate $\omega_{LW}$ (in other words: the yaw rate deviation Δω) as well as the time derivative of this deviation (acceleration deviation Δω̇). The calculation of parameters is essentially based on geometrical addition. The bottom part of FIG. 2 shows exemplarily a parameter (stability index) Θ determined from test values and weighting the yaw rate deviation Δω and the acceleration deviation Δω̇ by way of the coefficients P and D, which are adjustable in a vehicle-related fashion. The result is a PD controller, and the parameter Θ can be used for stabilization. The vehicle is considered unstable only in the period between $t_5$ and $t_6$ because the parameter Θ exceeds the value 40.

Principally a distinction is made between different scenarios with pressure build-up phases and pressure reduction phases depending on the ABS control condition of the vehicle within yaw torque influencing (GMB).

With ABS control on one side, unsymmetrical friction value differences are assumed, due to which different brake forces can be applied. The different forces induce a yaw torque about the vertical axis. There is a high-sensitivity reaction to instability in order to render it possible to the driver to react with gentle steering maneuvers. Initially, the low-wheel will undergo ABS control. The vehicle passes through a first stabilizing phase. In this phase, development of a first critical yaw rate amplitude is prevented by adjusting a defined pressure difference on the front axle depending on the 'actual' yaw rate level. FIG. 4 shows the maximum allowable pressure difference in dependence on the actual yaw rate (Ysens_fpd_press_diff) under the condition that ω̇ exceeds an absolute value of 6°/s². With rising yaw rate ω until roughly 10°/s there will be a linear reduction of the maximum allowable pressure difference on the front axle. Commencing in about 10°/s the allowable pressure difference remains constant until 15 bar approximately, yet the pressure difference is allowed to exceed or fall under this value in dependence on the vehicle, the desired adaptation, and tolerances.

The above-described yaw rate dependency considers the stronger tendency to instability of vehicles, which exhibit a yaw rate ω (e.g. due to lane changing or cornering maneuvers) already before the control begins. Vibration of the vehicle about the vertical axis is dampened by pressure modulation at the front wheel of the high coefficient-of-friction side, and the yaw rate deviation Δω is increased adequately. This gives the driver an opportunity of countersteering. On the high coefficient-of-friction wheel the brake force can be increased until this wheel also reaches its locking pressure level and enters into ABS control.

Referring to an initially one-sided ABS control intervention due to a low coefficient of friction on the left front wheel, FIG. 3 illustrates the yaw torque influencing method of the invention by way of the variations of desired yaw rate $\omega_{LW}$, actual yaw rate $\omega_{act}$, parameter Θ as well as the associated pressure variations on the high-wheel $p_{VR}$ and the low-wheel $p_{VL}$. Because the sign of parameter Θ is negative in point a, GMB becomes active with a reduction on the right front wheel (high-wheel). As becomes apparent from the pressure variations, wheel-slip-induced pressure reduction cycles b are adjusted on the low-wheel. Pressure reduction cycles c are performed on the high-wheel for reducing the pressure difference that develops. This pressure reduction takes into consideration the actual yaw rate $\omega_{act}$, as can be seen in FIG. 4. The following pressure build-up and pressure reduction cycles are based on an interaction of parameter and slip thresholds. Both wheels of the front axle are in ABS control at time $t_0$.

A declining parameter Θ between the points of time $t_1$ and $t_2$ renders a quasi sneaking instability tendency of the vehicle apparent. According to the invention, the reaction to this condition within GMB is a variation (extension) of the pressure build-up pauses d, e, and f on the high-wheel. When the parameter Θ at time $t_2$ reaches its minimum, a particularly long pressure build-up pause f obviously prevails. Following another pressure build-up g is then a pressure reduction h that is basically due to wheel slip. Moreover, the pressure variations $p_{VR}$ and $p_{VL}$ permit detecting the pressure difference between the two wheel brakes of the front axle that rises in the course of the ABS control cycles, allowing an improved brake effect.

The present invention permits detecting stable and unstable phases with greater reliability because the yaw rate sensor and the steering angle sensor provide signals that allow a precise adjustment between nominal and actual values.

Shorter stopping distances on μ-split roadways can be realized because the stable phases within ABS can be better utilized. Another advantage is the benefit gained in stability when braking in cornering maneuvers because pressure modulation on the curve-inward wheels helps the vehicle to maintain its track. Oversteering tendencies are thereby avoided.

Very unstable situations within ABS control are obviated and skidding of the vehicle is prevented so that ESP interventions within ABS control are mostly avoided.

The parameter (stability index) Θ is a central issue of the invention. It is possible within ABS control due to the stability index formed from the yaw rate deviation Δω and the acceleration deviation Δω̇ to early detect tendencies of the vehicle to instability and to react accordingly in connection with the described GMB method. The control is a closed-loop control in contrast to a superimposed ESP control that interrupts the ABS control for a brief interval.

Evaluations have shown that the parameter Θ plausibly represents vehicle conditions (oversteering, understeering). This result renders it possible to implement the invention in the described form or in modified form for further fields and conditions of application of electronic vehicle control systems (such as ABS, ESP, ESBS, EMB), in particular for the partial brake range. It is self-explanatory that in an adaptation for the partial braking range step 1 in FIG. 1 (ABS$_{13}$ FA=1) is not polled.

Finally, it should still be pointed out that all mentioned numerical values are meant exemplarily, and that in each case there is a top and a bottom tolerance range for adapting to the respective type of vehicle without departing from the essence of the invention.

| List of Reference Numerals: | |
|---|---|
| $\omega_{act}$ | (actual) yaw rate |
| $\omega_{LW}$ | desired yaw rate |
| Δω | yaw rate deviation |
| Δω̇ | (yaw rate) acceleration deviation |
| Θ | parameter (stability index) |
| $p_{VR}, p_{VL}$ | wheel braking pressure front right, front left |
| t | time |
| P, D | coefficients |

| -continued | |
|---|---|
| List of Reference Numerals: | |
| a | point |
| b | pressure reduction cycles |
| c, h | pressure reduction cycles |
| d, e, f, g | pressure build-up pauses |
| 1 | step |
| 2 | step |
| 3 | comparison |
| 4 | understeering tendency |
| 5 | oversteering tendency |
| 6 | step |
| 7 | right front wheel |
| 8 | left front wheel |
| 9 | step |
| 10 | unstable driving condition |
| 11 | pressure reduction modification |
| 12 | comparison |
| 13 | pressure build-up modification |
| 14 | stable vehicle |

What is claimed is:

1. A method for improving an anti-look control system, in which the wheel rotational behavior is measured and taken into account for determining the wheel slip and for brake pressure modulation, wherein the method includes the steps of determining driving stability by using at least one steering angle signal of a steering angle sensor for determining a desired yaw rate ($\omega_{LW}$) and by using at least one yaw rate sensor for measuring an actual yaw rate ($\omega_{act}$), and evaluating the driving stability by way of a parameter (Θ) that is determined for qualitatively and quantitatively judging a deviation between actual yaw rate ($\omega_{act}$) and desired yaw rate ($\omega_{LW}$) by employing the measured actual yaw rate (wood and by employing a measured desired yaw rate ($\omega_{LW}$) and by employing the time derivative of the difference (Δω) between actual yaw rate ($\omega_{act}$) and desired yaw rate ($\omega_{LW}$).

2. The method as claimed in claim 1, wherein the parameter (Θ) is determined according to the formula Θ=P*Δω̄+D*Δω̇ with Δω=$\omega_{act}$-$\omega_{WL}$ (yaw rate deviation) and $$\Delta\dot{\omega} = \Delta\omega \frac{\delta}{\delta t}$$

(acceleration deviation) and with P, D as vehicle-related coefficients.

3. The method as claimed in claim 1, wherein a brake pressure modification is effected through pressure build-up pulses and pressure reduction pulses, and the driving behavior is distinguished by way of the amount of parameter (Θ) in a stable or an unstable range indicating the extent the vehicle is oversteering or understeering, and when the vehicle is stable, a modification of the pause time (GMB_build-up pause) between respectively adjacent pressure build-up pulses is performed for the pressure build-up modification (13) on that wheel of the front axle that has the higher coefficient of friction with the mad, and wherein when the vehicle is unstable a pressure reduction modification (11) is performed by modifying the pressure reduction pulse length (GMB_reduction pulse), or a modification of a pause time (GMB_reduction pause) is performed between respectively adjacent pressure reduction pulses.

4. The method as claimed in claim 3,
wherein, when the vehicle is stable, a pressure build-up modification (13) with a pause time (GMB_build-up pause) is determined on the wheel with the higher coefficient of friction on the basis of the parameter ($\Theta$) for characterizing driving stability ($\Theta$) and a pause time (ABS_build-up pause) on the basis of wheel slip,
wherein the determined pause times are compared, and wherein the longer one of the determined pause times (Max(ABS_build-up pause, GMB_build-up pause) is used for pressure modulation on the wheel with the higher coefficient of friction.

5. The method as claimed in claim 3,
wherein, when the vehicle is unstable, a pressure reduction modification (11) with a pause time between adjacent pressure reduction pulses (GMB_reduction pause) and/or a pressure reduction pulse length (GMB_reduction pulse) is determined on the wheel with the higher coefficient of friction on the basis of the parameter ($\Theta$) and used for pressure modulation.

6. The method as claimed in claim 5,
wherein the pause time (GMB_reduction pause) is determined according to the formula (GMB_reduction pause=GMB_reduction_thr2−|$\Theta$|/GMB_reduction pause_quotient.

7. The method as claimed in claim 5,
wherein the pressure reduction pulse length (GMB_reduction pulse) is determined according to the formula GMB_reduction pulse=|$\Theta$|/GMB_reduction pulse_quotient.

8. The method as claimed in any one of claims 3, 5, 6, 7,
wherein, when the vehicle is unstable, modification of pressure reduction is not performed on the wheel with the higher coefficient of friction, and wherein modification of the pressure build-up is performed when the wheel brake pressure (Pmod_Wh_YTC) determined according to a pressure model is lower on the wheel with the higher coefficient of friction than the wheel brake pressure (Pmod_Wh_No_YTC) determined according to the pressure model on the wheel with the lower coefficient of friction.

9. The method as claimed in claim 3,
wherein, for parameters ($\Theta$) $\leq$40 on the wheel with the higher coefficient of friction, a pressure build-up modulation (13) for a stable driving condition is effected, and
wherein a pressure reduction modulation (11) for an unstable driving condition is performed for parameters ($\Theta$) roughly $\geq$40.

10. The method as claimed in claim 1
wherein the direction of instability (oversteering tendency/understeering tendency) is determined by comparing the signs of parameter ($\Theta$) and yaw rate deviation ($\Delta\omega$), and
wherein identical signs signal an oversteering tendency, and different signs signal an understeering tendency.

11. The method as claimed in claim 1,
wherein the vehicle wheel intended for yaw torque influencing is determined by the sign of the parameter ($\Theta$), and wherein a positive sign brings about yaw torque influencing on the left front wheel (VL), and that a negative sign brings about yaw torque influencing on the right front wheel (VR).

* * * * *